(12) United States Patent
Endal et al.

(10) Patent No.: US 8,226,327 B2
(45) Date of Patent: Jul. 24, 2012

(54) METHOD FOR LAYING A PIPELINE HAVING AN INNER CORROSION PROOF CLADDING

(75) Inventors: Geir Endal, Stavanger (NO); Erik Levold, Trondheim (NO); Håvar Ilstad, Trondheim (NO)

(73) Assignee: Statoil ASA, Stavanger (NO)

( * ) Notice: Subject to any disclaimer, the term of this patent is extended or adjusted under 35 U.S.C. 154(b) by 308 days.

(21) Appl. No.: 12/448,109

(22) PCT Filed: Nov. 30, 2007

(86) PCT No.: PCT/NO2007/000427
§ 371 (c)(1),
(2), (4) Date: Oct. 27, 2009

(87) PCT Pub. No.: WO2008/072970
PCT Pub. Date: Jun. 19, 2008

(65) Prior Publication Data
US 2010/0034590 A1    Feb. 11, 2010

(51) Int. Cl.
*F16L 9/02* (2006.01)

(52) U.S. Cl. ............ 405/154.1; 405/158; 405/166; 405/168.3; 405/170

(58) Field of Classification Search ........... 405/154.1, 405/158, 166, 167, 168.1–168.3, 169, 170, 405/211.1, 216
See application file for complete search history.

(56) References Cited

U.S. PATENT DOCUMENTS
3,712,100 A    1/1973  Key et al.
(Continued)

FOREIGN PATENT DOCUMENTS
EP    1 233 143    10/2006
(Continued)

OTHER PUBLICATIONS

International Search Report issued Mar. 12, 2008 in the International (PCT) Application No. PCT/NO2007/000427 of which the present application is the U.S. National Stage.

(Continued)

*Primary Examiner* — David Bagnell
*Assistant Examiner* — Sean Andrish
(74) *Attorney, Agent, or Firm* — Wenderoth, Lind & Ponack, LLP

(57) ABSTRACT

Method for laying a pipeline onto a seabed from a lay barge, the pipeline having an inner corrosion proof metallic cladding that is closely fitted with metallic contact to an outer pipe material that is less corrosion proof. The method includes reeling a section of the pipeline onto a pipe laying drum, while an overpressure of 5-25 bar is maintained within the section by a pressurized fluid inside the section, b) joining a further pipeline section to the section already reeled onto the pipe laying drum, while the pipeline is motionless without mechanical movement, as the overpressure can he relieved as long as the sections are without mechanical movement, c) applying an overpressure of 5-25 bar within the sections and the further section is reeled onto the pipe laying drum, d) and joining several sections together and reeling the joined sections onto one or several pipe laying drums by repeating step b) and c) until the predetermined pipeline length is achieved. The pipeline is laid from the lay barge onto the seabed using a conventional method, while an overpressure of 5-25 bar is maintained within the pipeline by means of a pressurized fluid until the pipeline is correctly placed onto the seabed.

8 Claims, 1 Drawing Sheet

U.S. PATENT DOCUMENTS

| | | | |
|---|---|---|---|
| 4,261,671 | A | 4/1981 | Langner |
| 6,142,707 | A | 11/2000 | Bass et al. |
| 2003/0044235 | A1 | 3/2003 | Stockstill |
| 2003/0056954 | A1 | 3/2003 | Headworth |
| 2006/0210361 | A1 | 9/2006 | Lamison |

FOREIGN PATENT DOCUMENTS

| | | | |
|---|---|---|---|
| GB | 1 517 955 | | 7/1978 |
| WO | WO 97/34101 | * | 9/1997 |
| WO | 2004/011837 | | 2/2004 |

OTHER PUBLICATIONS

Patent Cooperation Treaty (PCT) Written Opinion of the International Searching Authority issued Mar. 12, 2008 in corresponding International Application No. PCT/NO2007/000427.

Supplementary European Search Report (in English language) issued Feb. 10, 2010 in corresponding European Patent Application No. 07 85 1986.

* cited by examiner

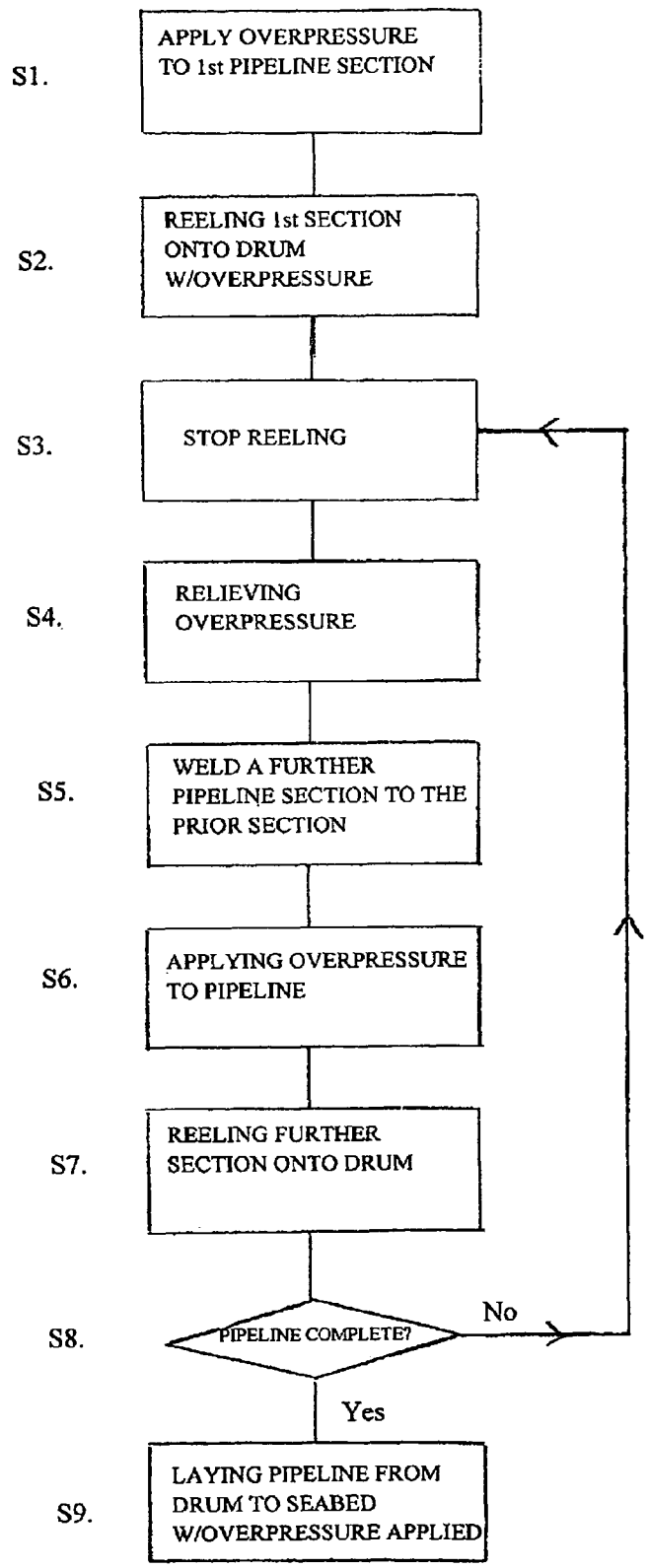

METHOD FOR LAYING A PIPELINE HAVING AN INNER CORROSION PROOF CLADDING

BACKGROUND OF THE INVENTION

1. Technical Field

The present invention relates to pipelines, which are laid onto the seabed, and more precisely a method for laying a pipeline onto a seabed from a lay barge, the pipeline having an inner corrosion proof metallic cladding that is closely fitted with metallic contact to an outer pipe material that is less corrosion proof. With the method according to the invention, a pipeline of the type mentioned can be arranged onto and laid into place from a laying drum on the lay barge.

2. Description of the Related Art

With an increasing need for transporting unprocessed well streams from underwater facilities, and more frequent occurrence of aggressive fluids with need to be transported, there is an increased demand for corrosion proof pipelines. However, the cost for pipelines of corrosion proof material has dramatically increased, and less expensive alternatives are therefore being sought after.

One such less expensive alternative is a pipeline of carbon steel with an inner more corrosion proof cladding. The strength of the carbon steel is thereby combined with the corrosion resistance of the cladding. The cladding is typically produced from a corrosion proof steel, a so-called stainless steel, and the cladding typically has a thickness from 1 to 7 mm, most typically about 3 mm. The cladding is fitted to the carbon steel pipeline's interior surface, either with mechanical contact or with metallurgical bonding by means of hot rolling (roll welding), welding, brazing or clad welding. The obviously least expensive alternative is that the inner cladding is fitted mechanically tightly against the carbon steel pipeline with metallic contact without any room in between. However, this embodiment has proven to be inadequate with respect to laying by reeling out from a pipe laying drum onboard a lay barge because the inner cladding becomes deformed by so-called "buckling/wrinkling", such as bulging, buckling, and subsequent possible fracturing. Such deformation will result in that the inner cladding will loosen from the carbon steel pipeline's interior surface, causing it to lose its ability to resist the impact during operation of the pipeline. This represents a problem, which needs to be solved.

No prior art is known that can solve the above-mentioned problem, which previously appears not to be particularly focused upon. Background art is represented by the patent publications US 2003/0056954 A1, which relates to a method for maintaining a pipeline in operation; U.S. Pat. No. 6,142,707, which relates to direct electrical heating of a pipeline; and EP 1233143 A1, which relates to coiled tubing operations inside wells. The patent publications describe an inner pipe installed within an outer pipe, but with spacing between the pipes and for most embodiments the inner pipe is a composite coiled tubing. The prior art referred to above relates to problems other than the problem underlying the present invention.

SUMMARY OF THE INVENTION

The above mentioned problem is solved with this invention by providing a method for laying a pipeline onto a seabed from a lay barge. The pipeline having an inner corrosion proof metallic cladding that is closely fitted with metallic contact to an outer pipe material that is less corrosion proof. The method is distinguished in that:

a) a section of the pipeline is reeled onto a pipe laying drum, whilst an overpressure of 5-25 bar is maintained within the section by means of a pressurized fluid inside the section;

b) a further pipeline section is joined to the section already reeled onto the pipe laying drum, whilst the pipeline is motionless without mechanical movement, as the overpressure can be relieved as long as the sections are without mechanical movement;

c) an overpressure of 5-25 bar is applied within the sections and the further section is reeled onto the pipe laying drum;

d) several sections are joined together and reeled onto one or several pipe laying drums by repeating step b) and c) until the predetermined pipeline length is achieved; and e) the pipeline is laid from the lay barge onto the seabed using a conventional method, whilst an overpressure of 5-25 bar is maintained within the pipeline by means of a pressurized fluid until the pipeline is correctly placed onto the seabed.

There are particularly two features of importance in this connection, namely that it is adequate with a relatively moderate overpressure, typically 5-25 bar, in order to avoid deformation (buckling/wrinkling) and lack of contact between the inner cladding and the outer pipeline material, and that the pipeline or pipeline sections shall have no mechanical movement when the prescribed overpressure is not applied within the pipeline or sections thereof. The language "without mechanical movement" means no reeling onto or unwinding from the pipe laying drum; or lowering of the pipeline from the lay barge onto the seabed, without the prescribed overpressure. Strain for instance during welding of the pipe sections is acceptable, so are minor deformations, as long as the deformation is minor compared to what the pipeline and components thereof are exposed to when reeling onto a typical pipe laying drum. The term an overpressure of 5-25 bar, refers to the inner cladding being biased with a pressure corresponding to 5-25 bar absolute (0.5-2.5 MPa) against the interior surface of the outer pipe material, which is less corrosion proof. A pressure lower than approximately 5 bar results in risk of deformation such as "buckling/wrinkling", whilst a pressure higher than approximately 25 bar would be impractical and may create problems.

BRIEF DESCRIPTION OF THE DRAWING

FIG. 1 is a flow diagram that represents a method of laying a pipeline onto a seabed according to an embodiment of the invention.

DETAILED DESCRIPTION OF THE INVENTION

The laying of pipelines onto the seabed is normally operated by means of large specialized lay barges. By using large drums, so-called pipe laying drums, with a diameter typically between 10 and 30 meters, it is possible to even lay massive steel pipelines, which are reeled onto the pipe laying drum beforehand. The pipeline is then lowered onto the seabed using a conventional method, for instance by S- or J-laying referring to the shape of the pipeline through the sea. The pipe laying drum typically has installed many pre-fabricated sections, where each section is typically 1 km long. The cladding is typically of stainless steel with a thickness of 3 mm, although other materials and thicknesses may also be usable. Increased cladding thickness may be an advantage as regards to pipes with large dimensions, in order to maintain correct surface pressure between the pipe materials. The exterior pipe material, which is less corrosion proof, is typically a thick walled carbon steel pipe, but other materials may also be usable.

So far it has not been possible to lay pipelines with an inner cladding of the type mentioned above since the cladding has been deformed by buckling, and this is the problem solved with the current invention.

With the present invention, an overpressure is applied within the pipeline or the sections thereof; at typically 5-25 bar by means of a pressurized fluid within the sections or pipeline. The necessary pressure is dependent on the diameter of the pipeline and the thickness of the inner corrosion proof cladding. Increased pressure will be necessary for increased diameter and a thinner cladding. A 5-10 bar overpressure is adequate for a 8"-10" pipe and a 2-3 mm thick cladding, whilst 10-20 bar overpressure is adequate for a 16" pipe with 2-3 mm thick cladding. The fluid can be nearly any form of liquid or gas, such as water under pressure, air (atmosphere) under pressure or an inert gas under pressure. On most occasions, water is preferred as the pressure medium because water is easily available and it is non-compressible and easy to pressurize to suitable pressure. If the vessel's capacity for storing and/or tension becomes critical due to the weight of the water-filled pipelines on the pipe laying drum, the preference is to use gas, for example compressed air. A necessary low overpressure will also make it more suitable to use a gas as the pressurized fluid.

Preferably, the entire pipeline should be reeled onto one pipe laying drum to avoid joining between pipeline lengths on different pipe laying drums. The problem of joining may however be avoided by bringing the pipeline though the center of one of the pipe laying drums to the center of the next pipe laying drum, and rotate the drums synchronically during the laying and winding of the pipe. Alternatively, separate methods may be used for joining the pipeline "sections, for instance by installing an ice plug on either one or both sides of the joint, whereby the overpressure can be maintained. Other devices, such as plugs and valves are also usable; likewise, various connecting subs and swivels.

Pumps, compressors, and necessary pipe system to control the overpressure need to be installed onboard the lay barge. The pipe sections are preferably mounted on one or several pipe laying drums, directly onboard the pipe laying vessel, otherwise the drums holding the pipe sections may be transported out to the lay barge and transferred onboard.

With reference to FIG. 1, a flow diagram indicating the process for laying the pipeline is shown. The process has steps S1 to S9 as follows:

S1: An over pressure is applied to an initial pipeline section to be reeled onto the drum.

S2: The pipeline section of S1 is reeled onto the drum whilst the over pressure is maintained in the pipeline section.

S3 & S4: Reeling of the pipeline section is stopped and the over pressure is relieved.

S5: A further, successive pipeline section is joined by welding the further pipeline section to the prior section which has already been reeled onto the drum.

S6: An over pressure is applied to the pipeline.

S7: The further section is reeled onto the drum.

S8: The steps of joining and reeling further sections onto the drum, i.e. steps S3 to S7, are repeated until a completed pipeline is formed.

S9: The pipeline is laid from the drum with an over pressure applied.

The invention claimed is:

1. A method for laying a pipeline onto a seabed from a lay barge, the pipeline having an inner corrosion proof metallic cladding that is closely fitted with metallic contact to an outer pipe material that is less corrosion proof, the method comprising:
   a) applying an overpressure to a first section of the pipeline by means of a pressurized fluid inside the first section, and reeling the first section of the pipeline onto a pipe laying drum while maintaining the overpressure within the first section;
   b) joining a second pipeline section to the first section which is already reeled onto the pipe laying drum, the second pipeline section being joined to the first section while the pipeline is motionless without mechanical movement;
   c) applying an overpressure within the pipeline sections and reeling the second section onto the pipe laying drum;
   d) joining together several additional pipeline sections and reeling the several additional sections onto said pipe laying drum or at least one further pipe laying drum by repeating step b) and step c) until a completed pipeline having a predetermined pipeline length is achieved; and
   e) laying the completed pipeline from the lay barge onto the seabed, while maintaining an overpressure within the completed pipeline by means of a pressurized fluid until the pipeline is correctly placed onto the seabed,
   wherein the overpressure of steps a), c) and e) is sufficient to avoid deformation of the cladding and lack of contact between the cladding and the outer pipe material.

2. The method in accordance with claim 1, wherein the overpressure of steps a), c) and e) is in a range of approximately 5 bar to approximately 25 bar.

3. The method in accordance with claim 1, wherein the fluid, which is used inside the completed pipeline or sections thereof, is water.

4. The method in accordance with claim 1, wherein the fluid, which is used inside the completed pipeline or sections thereof, is compressed air.

5. The method in accordance with claim 1, wherein the inner metal cladding is an approximately 3 mm thick cladding of stainless steel.

6. The method in accordance with claim 1, wherein the step of joining the second section to the first section includes relieving the overpressure within the pipeline.

7. The method in accordance with claim 6, wherein the step of joining the second section to the first section further includes welding the second section to the first section without an overpressure within the pipeline, as both the first and second sections are kept still with no mechanical movement.

8. The method in accordance with claim 1, wherein the overpressure used is dependent on the pipeline diameter in order to secure an integrity and configuration of the inner corrosion proof metallic cladding.

* * * * *